Sept. 2, 1941. E. TRAVIS 2,254,585
FEEDING DEVICE
Filed April 15, 1940
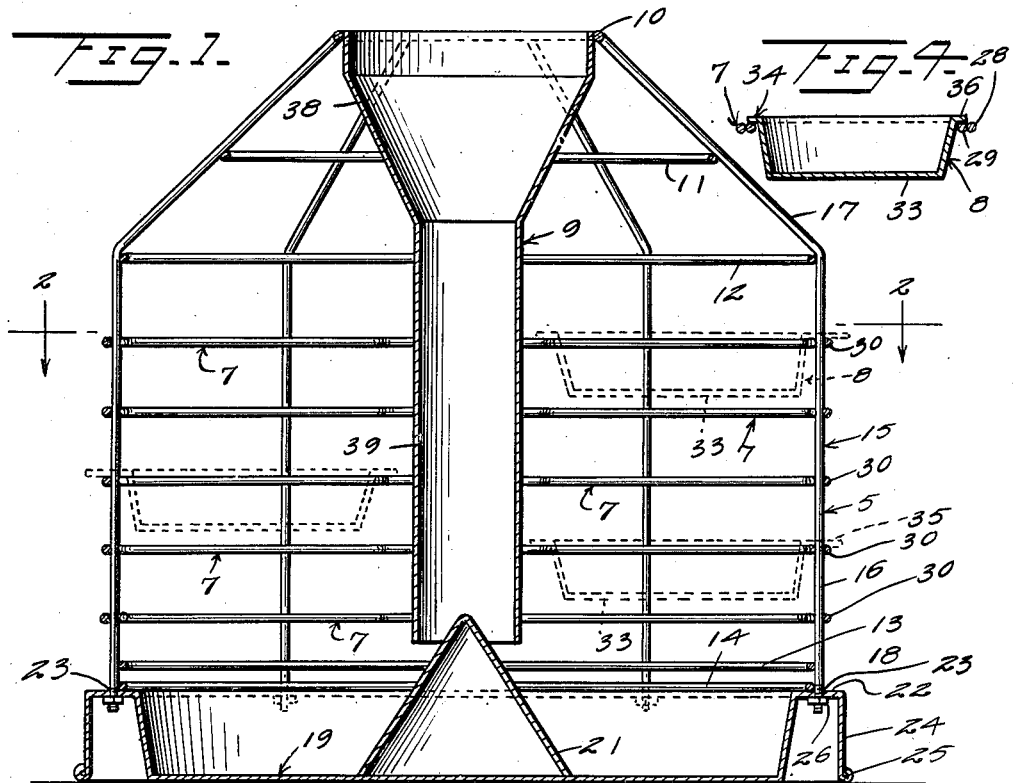
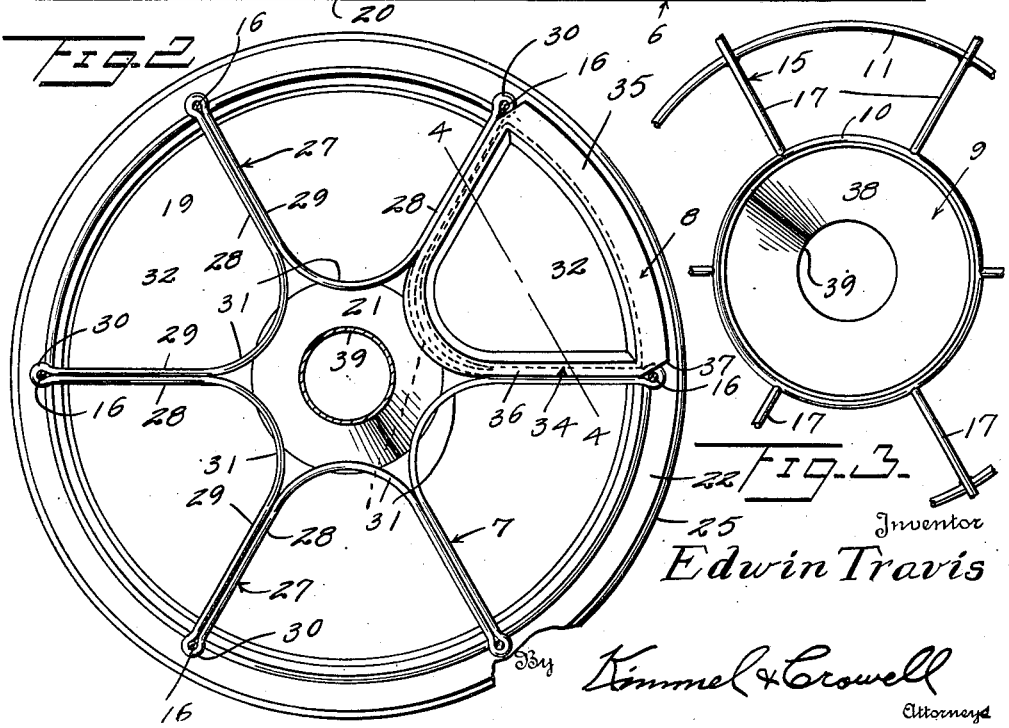
Inventor
Edwin Travis
By Kimmel & Crowell
Attorneys Patented Sept. 2, 1941

2,254,585

UNITED STATES PATENT OFFICE 2,254,585

FEEDING DEVICE

Edwin Travis, Peekskill, N. Y.

Application April 15, 1940, Serial No. 329,777

7 Claims. (Cl. 119—52)

This invention relates to a feeding apparatus or device designed primarily for feeding puppies and grown dogs of all sizes and breeds, but it is to be understood that an apparatus, in accordance with this invention, is for use in any connection for which it may be found applicable.

The invention aims to provide, in a manner as hereinafter set forth, a portable feeding apparatus for the purpose referred to including means for holding liquid, semi-liquid and solid feed within convenient reach of the animals.

The invention further aims to provide, in a manner as hereinafter set forth, a feeding apparatus for the purpose referred to including a hollow element of pan-like form functioning as a hollow base and a feed holder, and with such element so constructed and arranged in relation to the other elements of the apparatus as to prevent the latter or such element being upset by the animals when they are feeding.

The invention further aims to provide, in a manner as hereinafter set forth, a feed apparatus including a holder for liquid or semi-liquid feed having means to prevent a portion of the feed from lodging centrally of the holder and out of reach of the animals when they are feeding.

The invention further aims to provide, in a manner as hereinafter set forth, a feeding apparatus for the purpose referred to including an upstanding skeleton or frame-like body portion and a set of feed holders each capable of being selectively, removably mounted at different levels within and relative to said body portion.

The invention further aims to provide, in a manner as hereinafter set forth, an apparatus or device for the purpose referred to with a separate booth for each animal to eat at to thereby prevent the animals from crowding each other and getting their feet into the hollow element aforesaid, which functions not only as the base of the apparatus, but also as a feed holder.

The invention further aims to provide, in a manner as hereinafter set forth, an apparatus for the purpose referred to including a holder for a liquid or semi-liquid feed and means for supplying the feed to the holder, and with such holder and means so correlated as to prevent splashing of the feed when it is supplied to the holder.

The invention further aims to provide, in a manner as hereinafter set forth, an apparatus for the purpose referred to which is simple in its construction and arrangement, strong, durable, readily portable, thoroughly efficient in its use, expeditiously assembled and disassembled, and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a vertical sectional view of a feeding apparatus in accordance with this invention, Figure 2 is a section on line 2—2 Figure 1, Figure 3 is a fragmentary view in top plan, and Figure 4 is a section on line 4—4 Figure 2.

The apparatus or device includes a skeleton or frame-like body portion 5, a combined base and feed holding member 6 on which said body portion 5 is mounted and detachably connected to, a set of superposed aligned combined supporting and compartment forming elements 7 arranged within the body portion 5, a set of feed holders 8 each for selectively mounting on an element 7 within a compartment formed by such elements, and a feed conducting member 9 disposed axially of the body portion 5 and leading to member 6.

The body portion 5 includes a series of superposed annular body members 10, 11, 12, 13, 14. The member 10 is the upper one of said series of body members and it is of less diameter than the member 11. The latter is arranged directly below the member 10. The member 11 is of less diameter than the members 12, 13 and 14. The members 12, 13 and 14 are of like diameter. The said members of the said series of superposed annular body members are co-axially arranged. The member 12 is spaced a greater distance from the member 13 than the distance between member 12 and member 11 and member 11 and member 10. The member 14 is the lowermost member of said series of superposed body members and is arranged directly below the member 13. The distance between the members 13, 14 is materially less than the distance between the members 12 and 13.

The body portion 5 includes a series of vertically disposed uprights 15 arranged in a circular row and disposed in equi-distant spaced relation. Each upright 15 includes a vertical lower portion 16 and an inwardly inclined upper portion 17 of less length than the portion 16. The lower terminal part of the portion 16 is peripherally threaded as at 18. The portions 17 of the uprights 15 have their upper ends welded or otherwise secured to the body member 10. The body member 11 is arranged within and suitably secured to the inner sides of the portions 17 of the uprights 15. The body members 12, 13 and 14 are arranged within and suitably secured to the inner sides of the portions 16 of the uprights 15. The body member 14 is positioned above the lower terminal parts of the portions 16 of the uprights 15.

The combined base and feeding holder member 6 includes a body portion 19 of pan-like form having integral with and disposed axially of the upper face of the bottom 20 thereof a vertically disposed hollow cone-shaped member 21 of greater height than said body portion 19. The latter is of circular form and is provided at its upper end with a laterally extended annular flange 22 formed with a row of perforations 23 corresponding in number to the number of standards 15. The diameter of the flange 22 is greater than the diameter of the body members 12, 13 and 14. The flange 22 at its outer end merges into a depending annulus 24, which encompasses and is spaced from the pan-like body portion 19 of the member 6. The bottom edge of the annulus 24 aligns with the lower face of the bottom 20 of the body portion 19 and said annulus 24 acts to prevent the upsetting of the member 6 by the animals when they are feeding. The lower portion of the annulus 24 is formed with a rounded bead 25 for reinforcing purposes.

The body member 14 of the body portion 5 is seated on the flange 22 inwardly of the perforations 23, whereby said body portion 5 is supported from the member 6. When the body portion 5 is disposed in superimposed relation with respect to the member 6, the portions 16 of the standards 15 extend down through the perforations 23. The body portion 5 is detachably connected to the member 6 by the nuts 26, which threadedly engage with the said portions 16 and are adjusted to bind against the inner face of the flange 22. The nuts 26 in connection with the body member 14 detachably connect the body portion 5 to the member 6. When the body portion 5 is detachably connected to the member 6 the cone 21 extends up into the body portion 5 at the lower part of the latter.

The combined supporting and compartment forming elements 7 are of like form and are coaxially arranged, as well as being disposed coaxial with the body portion 5. The elements 7 are arranged within the body portion 5 between the body members 12 and 13. Each element 7 is constructed from a length of wire of the desired gauge having its ends secured together and bent in a manner to form radially disposed arms 27 formed of a pair of sections 28, 29 connected together at their outer ends by a split loop 30, which encompasses and is secured to a portion 16 of a standard 15. The wire from which an element 7 is formed is also bent in a manner to provide a series of spaced coupling portions 31 of arcuate contour. The said coupling portions are arranged at the inner ends of the arms 27 and each coupling portion 31 connects the section 28 of an arm 27 to the section 29 of an adjacent arm. The arms 27 of an upper element 7 align with the arms 27 of a lower element 7. A pair of opposed arms 27 of each element 7 constitutes a supporting means for a purpose to be referred to. The aligned arms of the said elements 7 provide the body portion 5 with a row of flared open top and bottom compartments 32 extending from a point below the body member 12 to a point above the body member 13 of body portion 5. The compartments 32 open outwardly and each compartment is for the use of an animal when feeding. The coupling portions 31 also provide supporting means and when acting in such connection correlate with the arms 27. The coupling members 31 further constitute what may be termed the inner walls of the compartments 32.

Each of the feed holders 8 of the set of feed holders is adapted to be supported within a compartment 32 at selective levels. The feed holders 8 are of like form and correspond substantially in contour to that of the compartments 32. Each of the feed holders 8 includes a pan-like flared body portion 33 formed at its top with an outwardly directed endless flange 34 having its front portion 35 of greater width than its remaining portion 36. Each holder 8 when mounted in a compartment has a portion 36 of its flange 35 seating on the section 28 of one arm 27, the section 29 of an adjacent arm 27 and upon the coupler connecting such sections 28, 29 together and the arrangement will be such as disclosed by Figure 2 with the portion 35 of the flange 34 projecting outwardly beyond a pair of loops 30. The end edges 37 of the flange portion 35 are oppositely inwardly inclined to form a clearance for the portion 35 relative to the portions 16 of a pair of standards 15 and in this connection attention is directed to Figure 2.

The conducting member 9 is disposed co-axially with the body portion 5 and extends from the top of the latter to a point in proximity to the body member 13. The conducting member 9 is formed with a depending funnel-shaped upper portion 38 having its upper end surrounded by the body member 10 as well as having said end secured to the inner face of such member. Integral with the lower end of the portion 38 of member 9 is the upper end of what may be termed a spout 39 which extends from portion 38 to a point in proximity to body member 13 and has the upper portion of the cone 21 extend into its lower end in spaced relation thereto. The cone 21 correlates with the member 9 to prevent the splashing of the feed when it is conducted or directed by said member 9 to the member 6, and said cone also acts to prevent the feed from centering at the central portion of the member 6.

Preferably the base member 6 will be employed for holding a liquid or semi-liquid feed and each of the holders 8 will be employed for solid feed.

What I claim is:

1. A feeding device for puppies and grown dogs including a hollow base open at its top, an annular skeleton body portion mounted in superimposed relation to and connected to the base, means within and secured to said body portion providing a plurality of independent skeleton open bottom compartments arranged over the base, a feed conductor within said body portion leading to said base and disposed in coaxial relation with respect to said means and body portion, said conductor having its upper end secured to and its lower end spaced above the lower end of said body portion, and said base including a cone-shaped member projecting thereabove and into the lower portion of the conductor.

2. In a feeding device for puppies and grown dogs, an annular upstanding body portion having a lower part of uniform diameter and an upper part gradually increasing in diameter towards and merging at its lower end into the upper end of said lower part, the latter being of greater height than said upper part, superposed means arranged within and secured to the said lower part of said body portion providing the latter with laterally opening independent vertically disposed compartments, said means forming superposed supports for correlation with each compartment, and feed holders, each for selectively positioning at different levels within a compartment on a support correlated with the latter.

3. In a device for puppies and grown dogs, an annular skeleton body portion, a combined base and feed holder member formed with a laterally extended annular flange, said body portion being provided with means to form it with a plurality of radially disposed independent compartments open at their bottoms and front and arranged over said member, said body portion being mounted on said flange and having means correlated with said flange for detachably connecting said body portion to and in superimposed relation relative to said member, and a tubular feed conducting means disposed axially of and suspended from the upper end of said body portion, said conducting means having its lower end arranged above the lower end of said body portion, and said member being formed axially thereof with a cone projecting thereabove and into the lower end of said conducting means.

4. In a feeding device for puppies and grown dogs, a vertically disposed skeleton-like structure having superposed means forming it between its upper and its lower end with a plurality of radially disposed independent flared upstanding compartments each open at its front, its top and its bottom and including an inner wall and a pair of side walls, said means providing each compartment with a plurality of superposed vertically aligned supports, and feed holders each for selectively positioning in a compartment upon a selected support whereby the height of the holder relative to a compartment may be varied.

5. In a feeding device for puppies and grown dogs, a plurality of feed holders, a skeleton-like structure formed with a plurality of radially disposed vertical compartments each for removably receiving a feed holder, said compartments opening at their fronts and each having a rear wall and a pair of side walls, each of said walls being formed with a plurality of superposed spaced aligned sections, said inner walls merging into said side walls, the said walls of each compartment forming selectable superposed vertically aligned spaced supporting means for the feed holder received therein to thereby provide for varying the level of the holder with respect to the compartment.

6. In a feeding device for puppies and grown dogs, a plurality of feed holders, a skeleton-like structure formed with a plurality of radially disposed compartments each for removably receiving therein a feed holder, said compartments opening at their fronts and each having a rear wall and a pair of side walls, each of said walls being formed with a plurality of superposed spaced sections, said inner walls merging into said side walls, the said walls of each compartment forming selectable superposed supporting means for the feed holder inserted therein to thereby provide for varying the level of the holder with respect to the compartment, and a base connected to the lower end of said structure and formed with a body part and a vertically disposed annulus spaced from said body part and disposed outwardly with relation to said structure.

7. In a feeding device for puppies and grown dogs, an annular upstanding body portion of skeleton form having a lower part of uniform diameter and an upper part of gradually increasing diameter towards and merging at its lower end into the upper end of said lower part, the latter being of greater height than said upper part, said body portion being formed with vertically disposed laterally opening independent compartments in the said lower part thereof, said compartments being open at the top, bottom and front thereof, an open top hollow base constituting a feed holder, said body portion being disposed in superimposed relation with respect to and connected to the base, and a feed conducting means disposed axially of said body portion and leading to said holder, said conducting means being surrounded by said compartments.

EDWIN TRAVIS.